United States Patent [19]
Schmidt

[11] 3,839,712

[45] Oct. 1, 1974

[54] DIFFERENTIAL PRINT-OUT SHADING TECHNIQUE FOR DIGITAL SYSTEMS

[75] Inventor: Arthur W. Schmidt, Midland, Tex.

[73] Assignee: Schlumberger Technology Corporation, New York, N.Y.

[22] Filed: Apr. 19, 1972

[21] Appl. No.: 245,602

Related U.S. Application Data

[63] Continuation of Ser. No. 128,151, March 25, 1971, abandoned, which is a continuation of Ser. No. 707,205, Feb. 21, 1968, abandoned.

[52] U.S. Cl............................ 340/324 R, 350/269
[51] Int. Cl............................................. G02f 1/34
[58] Field of Search .... 340/324 R, 324 A, 15.5 BH, 340/378 R; 350/269; 178/7.6; 181/.5 OS; 346/33 C, 33 W, 107 W, 107 SC

[56] References Cited
UNITED STATES PATENTS

| | | | |
|---|---|---|---|
| 2,089,484 | 8/1937 | Kleber | 350/269 |
| 2,639,379 | 5/1953 | Blancher | 340/324 A |
| 3,284,766 | 11/1966 | Sterry | 340/324 A |
| 3,422,419 | 1/1969 | Mathews et al. | 340/324 A |

Primary Examiner—John W. Caldwell
Assistant Examiner—Marshall M. Curtis
Attorney, Agent, or Firm—Brumbaugh, Graves, Donohue & Raymond

[57] ABSTRACT

One embodiment of the invention provides a circuit that switches the control of a graphical reproduction device between two input signals in order to produce a trace that shifts back and forth within the space bounded by two curves that correspond to these signals. This oscillating motion, through distances determined by the amplitudes of the respective input signals, produces a graph that has a shaded visual effect. Circuits for controlling the operation of two or more reproduction devices to produce other shading effects also are shown and described.

12 Claims, 3 Drawing Figures

INVENTOR.
Arthur W. Schmidt
BY John P. Sinnott
ATTORNEY

DIFFERENTIAL PRINT-OUT SHADING TECHNIQUE FOR DIGITAL SYSTEMS

This application is a continuation of Application Serial No. 128,151 filed March 25, 1971 now abandoned.

It is an object of the invention to provide an improved technique for shading the space bounded by two curves traced on the same graph.

It is another object of the invention to provide an improved circuit to automatically shade the area on a graph that is bounded by two input signals.

It is a further object of the invention to switch control of one or more graphical reproduction mechanisms alternately between two input signals in order to cause the mechanisms to generate oscillating outputs, the amplitudes of each of the oscillations being determined by the two input signals.

The present invention is useful particularly in the interpretation of oil well logs. Occasionally, as many as eleven continuous curves are traced on one log or graph; and the analysis of these curves depends, to a certain extent, on recognizing the degree of separation between several of the curves. The features characterizing these separations are identified clearly and accurately by automatically shading the areas between related pairs of curves without resorting to laborious manual labeling, coloring or shading.

For a better understanding of the invention, reference is had to the following description taken in connection with the accompanying drawings, the scope of the invention being pointed out in the appended claims.

Referring to the drawings.

Figure 1:
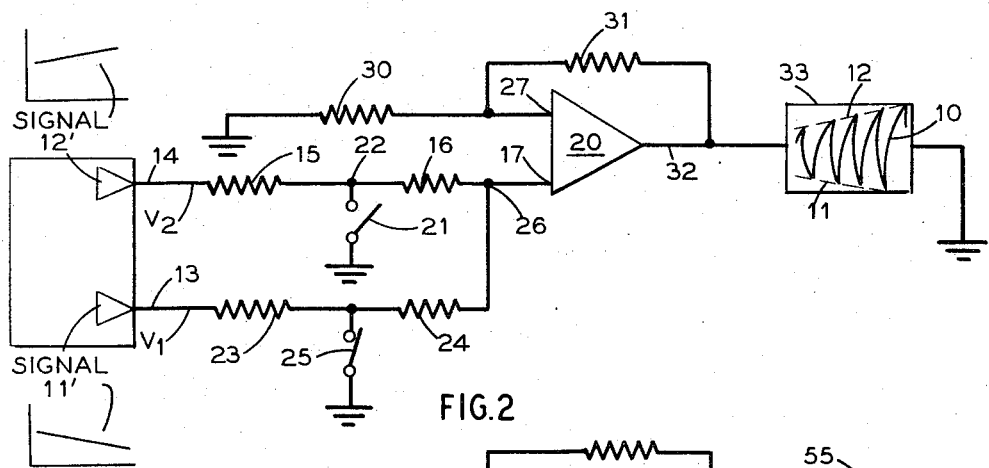
FIG. 1 is a schematic diagram of an exemplary circuit for producing a graph in accordance with the invention.

In accordance with the invention, FIG. 1 shows a typical means for generating a shaded trace 10. The maximum amplitude of each oscillation in the trace 10 is bounded by curves 11 and 12. Thus, the curves 11 and 12 impose limits that define the space traversed by each successive sweep of a stylus, or other visual reproduction device, as for example, the recording galvanometers described in U.S. Pat. No. 2,623,083 granted to Schlumberger and Picard on Dec. 23, 1952, and U.S. Pat. No. 2,623,084 granted to Schlumberger, Picard and Barrateau on Dec. 23, 1952, assigned to the assignee of the invention described herein.

To generate the shaded trace 10, input signals 11' and 12' that correspond to the associated boundary curves 11 and 12, are applied to respective input channels 13 and 14. The channel 14 is a circuit that includes a path through series resistors 15 and 16 to an input terminal 17 of an operational amplifier 20. A switch 21 selectively grounds a terminal 22 common to the resistors 15 and 16, as described subsequently in more complete detail.

Similarly, the channel 13 comprises a path through series resistors 23 and 24 to a junction 26. The junction 26 connects the channel 13 to the input terminal 17 of the amplifier 20 and the channel 14. A grounding switch 25, moreover, is coupled to the junction common to the resistors 23 and 24.

Preferably, the grounding switches 21 and 25 comprise transistors controlled by a free-running multivibrator (not shown) that alternately enables and disables the switches 21 and 25 in out-of-phase relation, thereby blocking the simultaneous application of both the signals 11' and 12' to the amplifier 20. The out-of-phase operation of the switches 21 and 25 thus enables successive portions of the signals 11' and 12' to be coupled to the input terminal 17 of the amplifier 20.

The amplifier 20 has a second input terminal 27, connected to ground through an input resistor 30. A feedback resistor 31 connects the input terminal 27 to a conductor 32 at the output terminal of the amplifier 20. In order to avoid distorting the signals in the output conductor 32, the feedback resistance 31 is adjusted or selected to produce an amplifier gain of 1.

The signals in the output conductor 32 control a visual reproduction apparatus 33, as for example, a servo-driven stylus, a galvanometer or the like.

In operation, the switch 25 is automatically closed in order to shunt the signal 11' in the channel 13 to ground through the resistor 23. During the time the switch 25 is closed, the switch associated with the channel 14 is opened to pass the signal 12' to the amplifier input terminal 17. Subsequently, the switch 21 is closed to shunt down the signal 12'. After the signal 12' is grounded, the switch 25 is opened and disconnects the channel 13 from ground to permit the signal 11' to pass through to the amplifier 20.

Typically, these sequential portions of the signals 11' and 12' are gated through at a frequency of about 20 to 40 cycles per second. The graphic reproduction mechanism 33 responds to these successive signals from the output of the amplifier 20 by driving a stylus, or the like, on an oscillating track, the sweep of which is determined by the amplitudes of the sequentially received portions of the signals 11' and 12'. The input signals 11' and 12' in effect define an envelope that fixes the boundaries of the trace 10. Additionally, two additional reproduction mechanisms (not shown) may be coupled directly to the signals 11' and 12', respectively, to produce two continuous curves that outline or draw an envelope for the limits of the shaded trace 10.

Figure 2:
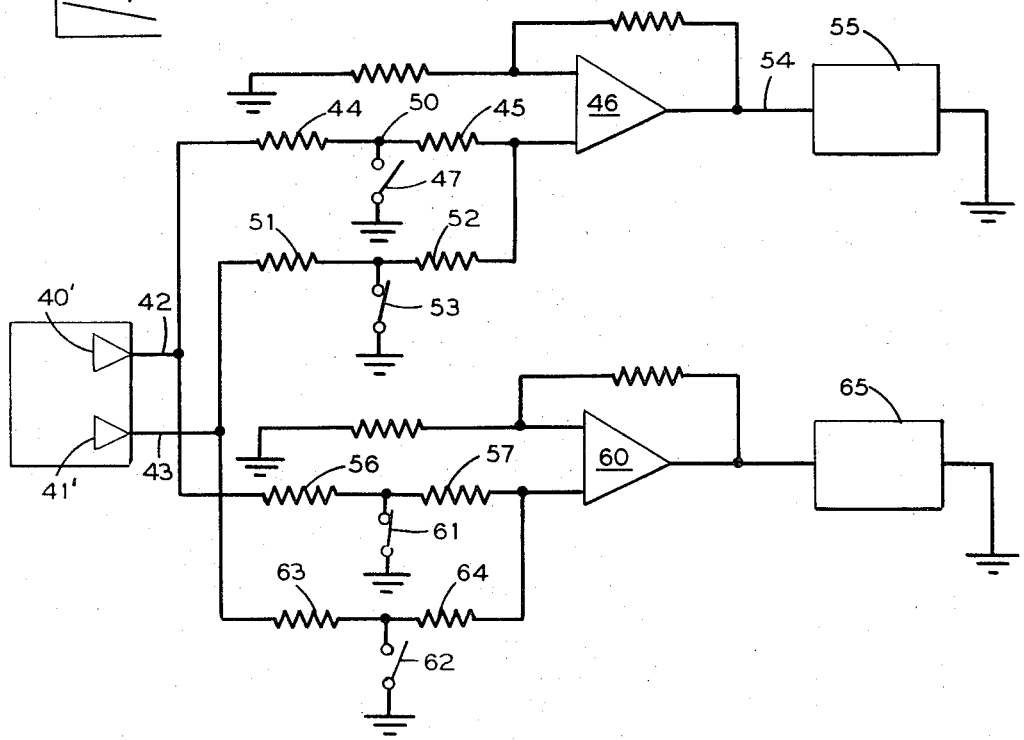
FIG. 2 is another exemplary circuit for practicing the invention.

Another exemplary illustration of the invention is shown in FIG. 2. Input signals 40' and 41' are applied to respective input channels 42 and 43. The signal 40' in the input channel 42 is coupled to a reproduction mechanism 55 through one branch of a parallel circuit that includes series resistors 44 and 45, a unity gain amplifier 46 and an output conductor 54 when a switch 47 that is common to the resistors 44 and 45 is opened.

The other parallel branch of the channel 42 at the same time is connected to ground through a resistor 56 and a closed grounding switch 61. When opened, however, the switch 61 passes the signal 40' to a reproduction mechanism 65 through a path that includes the resistor 56, a resistor 57 and a unity gain amplifier 60.

The input signal 41', applied to the channel 43, is grounded through a path that includes a resistor 51 and a grounding switch 53 whenever the switch 47 is opened to pass the signal 40' to the reproduction mechanism 55. When the switch 47 is closed in order to pass the signal 40' to ground, however, the switch 53 is opened at the same time to pass the input signal 41' to the reproduction mechanism 55 through a path that includes the resistor 51, a resistor 52, the amplifier 46 and the output conductor 54.

The signal 41' in the second parallel branch of the input channel 43 is passed to the reproduction mechanism 65 through series resistors 63 and 64 and the amplifier 60 when a grounding switch 62 is opened. Subsequently, the signal 41' is shunted to ground through the resistor 63 and the closed switch 62 before the switch 61 in the channel 42 is opened to pass the signal 40' through to the reproduction mechanism 65.

As hereinbefore mentioned in connection with FIG. 1, the individual switches in the respective pairs of switches 47, 53 and 61, 62 preferably comprise transistors controlled by one or more free-running multivibrators (not shown). The signals from the multivibrator, for example, enable the switches 47 and 62 to close before the companion switches 53 and 61 are opened. In the embodiment of the invention shown in FIG. 2, moreover, the switches 47 and 62 are opened and closed at the same time, while the respective companion switches 53 and 61 also are operated together but in about a 180° out-of-phase relation with the switches 47 and 62.

A shaded trace 68 produced by the reproduction mechanisms 55 and 65 in response to the operation of the circuit (FIG. 2) described above is shown in FIG. 3. The upper and lower limits of the shading are bounded by curves 40 and 41 that correspond to the two input signals 40' and 41', respectively. Additionally, a second pair of reproduction mechanisms (not shown) can be coupled directly to the input signals 40' and 41' to produce a solid outline for the heavily shaded trace 68.

The shaded trace 68 produced by the out-of-phase operation of the reproduction mechanisms 55 and 65 is darker than the shading generated by the embodiment of the invention shown in FIG. 1. Naturally, the traces 10 and 68 are capable of substantial variation to more clearly delineate the separation between the respective sets of the curves 11, 12 and 40, 41. For example, different colors can be used to generate the traces, intermittent operation of the oscillating trace and changes in the phase relation between the signals applied to the reproduction mechanisms are a few of the many possible variations that are within the purview of the present invention.

The present invention, moreover, is not limited in scope to analog signal techniques. For example, the principles of the invention can be used to convert digital, discontinuous or "quantized" input signals into shaded analog output graphs by shifting reproduction mechanism control back and forth between two related sets of input data.

Specifically, four sets of well logging data are given below designated as input signal curves 1 through 4, inclusive. These four sets of discrete data points are reproduced on a single graph, in which the separation between sets 1 and 2 is shown in heavy shading (as in FIG. 3). By way of contrast, sets 3 and 4 are drawn as conventional continuous curves. Illustratively, quantized data of the sort shown below is prepared from borehole logging tool signals that are stored, for example, on tape, punched cards or memory drums.

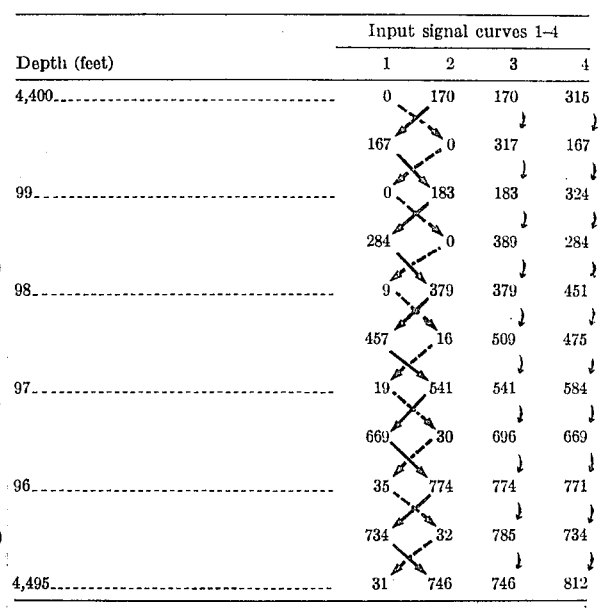

| Depth (feet) | Input signal curves 1–4 | | | |
|---|---|---|---|---|
| | 1 | 2 | 3 | 4 |
| 4,400 | 0 | 170 | 170 | 315 |
| | 167 | 0 | 317 | 167 |
| 99 | 0 | 183 | 183 | 324 |
| | 284 | 0 | 389 | 284 |
| 98 | 9 | 379 | 379 | 451 |
| | 457 | 16 | 509 | 475 |
| 97 | 19 | 541 | 541 | 584 |
| | 669 | 30 | 696 | 669 |
| 96 | 35 | 774 | 774 | 771 |
| | 734 | 32 | 785 | 734 |
| 4,495 | 31 | 746 | 746 | 812 |

Figure 3:
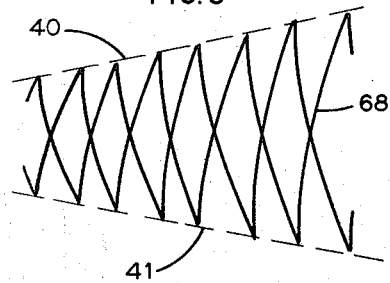
FIG. 3 is a typical graph produced by the circuit shown in FIG. 2.

Input signal curves 1 and 2 produce a heavily shaded graph, similar to the trace 68 in FIG. 3, where the original data before applying the shifting technique is denoted by the arrows (→) and (→).

The arcuate arrows ( ↲ ) show the paths of values for a reproduction mechanism where the data for the curves 3 and 4 produce continuous curve traces by the consecutive application of each signal to the respective stylus or reproduction mechanism.

Thus, the invention provides a technique that enables the separation between any two curves on the same graph to be identified with ease. This system permits related pairs of curves in visually complicated multiple-trace graphical presentations to be distinguished with relative ease.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. Apparatus for visually representing at least a portion of the difference between first and second well logging data signals obtained from an exploring device moved through a well borehole, comprising:
   a recording medium adapted for displaying visible indicia thereon;
   drive means for moving said recording medium at a speed representative of the speed of movement of the exploring device through the well borehole;
   writing means adapted for producing visual indicia on said recording medium;
   generating means for generating a control signal having a preselected frequency; and
   directing means, responsive to the control signal and the first and second well logging data signals, for causing said writing means to produce visual indicia across an intervening portion of said recording medium between positions dictated by the first well logging data signal and positions dictated by the second well logging data signal, said visual indicia being produced across the intervening portion of said recording medium at a speed suitable to cause its repetitive visual production.

2. The apparatus of claim 1 wherein said directing means comprises a switching means connected to said first and second well logging signals for alternately inhibiting the well logging signal at a rate determined by the control signal, means for summing the inhibited well logging signals and means for controlling the position of said writing means on said recording means in response to the sum of the inhibited well logging signals.

3. The apparatus of claim 1 wherein said recording medium provides visible indicia thereon in response to energy of a predetermined nature, said writing means includes a beam of energy and said directing means includes beam-directing means for directing said beam of energy in response to the first and second well logging data signals and the control signal.

4. The apparatus of claim 3 further including a second beam of energy in said writing means and a second beam-directing means for directing said second beam of energy alternately across an intervening portion of said recording medium between positions dictated by the first well logging data signal and positions dictated by the second well logging data signal, said second beam of energy moving across the intervening portion of said recording medium at a speed suitable to cause it to produce additional repetitive visual design indicia.

5. The apparatus of claim 1 wherein said preselected frequency is adjusted so as to produce alternating visual design indicia extending back and forth across the intervening portion of said recording medium with the terminations of said visual design indicia defining first and second envelope boundaries respectively representative of said first and second well logging signals.

6. The apparatus of claim 1 wherein said drive means moves said recording medium along a selected axis; and said visual design indicia include a plurality of successive substantially-arcuate traces respectively intersecting said selected axis at spaced intervals with the opposite ends of said traces respectively defining representations of spaced portions of said first and second well logging data signals.

7. The apparatus of claim 1 wherein said preselected frequency of said control signal is between about 20 and 40 cycles per second.

8. The apparatus of claim 1 wherein said recording medium includes first and second recording devices and said directing means includes means for alternately coupling said first and second well logging signals to said first and second recording devices in succession and in a phased relationship so that said first recording device will produce a first series of interconnected successively-displaced continuously-alternating arcuate traces back and forth across said intervening portion of said recording medium respectively intersecting said selected axis at uniformly spaced intervals with their joined ends respectively defining a first series of spaced portions representative of said first and second well logging data signals and said second recording device will produce a second series of interconnected successively-displaced continuously-alternating arcuate traces back and forth across said intervening portion of said recording medium respectively intersecting said selected axis at uniformly-spaced intervals and alternately dispersed between said first series of arcuate traces with the joined ends of said second series of arcuate traces respectively defining a second series of spaced portions representative of said first and second well logging data signals.

9. The apparatus of claim 8 wherein said second series of arcuate traces are uniformly spaced between said first series of arcuate traces.

10. The apparatus of claim 3 wherein said energy is visible light and said recording medium is a light-sensitive film.

11. The apparatus of claim 4 wherein said first and second beam-directing means are operated at about 180° out of phase in relation to one another so that said first and second series of traces are uniformly spaced from one another.

12. A method for visually representing at least a portion of the difference between first and second well logging data signals obtained from an exploring device moved through a well borehole, comprising the steps of:
driving a recording medium at a speed representative of the speed of movement of the exploring device through the well borehole;
alternately selecting portions of the first and second well logging signals at a preselected rate and summing the selected portions to produce a sum signal; and
moving a writing means across said recording means in response to the sum signal at a speed suitable for it to produce repetitive visual indicia between the positions dictated by the first well logging data signal and positions dictated by the second well logging data signal.

* * * * *